United States Patent [19]
Russo

[11] Patent Number: 5,531,099
[45] Date of Patent: Jul. 2, 1996

[54] UNDERGROUND CONDUIT DEFECT LOCALIZATION

[75] Inventor: Anthony P. Russo, Bloomfield, N.J.

[73] Assignee: AT&T Corp., Murray Hill, N.J.

[21] Appl. No.: 336,452

[22] Filed: Nov. 9, 1994

[51] Int. Cl.⁶ ............................................. G01M 3/080
[52] U.S. Cl. ............................... 73/40.50 A; 73/592
[58] Field of Search ................................. 73/592, 40.5 A

[56] References Cited

U.S. PATENT DOCUMENTS

| | | | |
|---|---|---|---|
| 3,626,750 | 12/1971 | Talmon | 73/40.5 A |
| 3,903,729 | 9/1975 | Covington | 73/40.5 R |
| 4,289,019 | 9/1981 | Claytor | 73/40.5 A |
| 4,327,576 | 5/1982 | Dickey et al. | 73/40.5 A |
| 4,543,817 | 10/1985 | Sugiyama | 73/40.5 A |
| 4,858,462 | 8/1989 | Coulter et al. | 73/40.5 A |
| 5,038,614 | 8/1991 | Bseisu et al. | 73/592 |
| 5,117,676 | 6/1992 | Chang | 73/40.5 A |
| 5,333,501 | 8/1994 | Okada et al. | 73/592 |
| 5,361,636 | 11/1994 | Farstad et al. | 73/592 |
| 5,398,542 | 3/1995 | Vasbinder | 73/40.5 A |

*Primary Examiner*—Hezron E. Williams
*Assistant Examiner*—Jay L. Politzer

[57] ABSTRACT

A method of locating a defect in a buried conduit by sensing vibrations generated at the defect, processing signals detected by sensors to generate a cross-correlation function, smoothing this function to obtain a peak, calculating a center velocity of acoustic energy propagation, and using the center velocity of acoustic energy propagation to calculate the location of the defect.

27 Claims, 5 Drawing Sheets

FIG. 1A
SINGLE VELOCITY CORRELATION

FIG. 1C
MULTIPLE VELOCITY CORRELATION

FIG. 3A
MULTIPLE VELOCITY CORRELATION

UNDERGROUND CONDUIT DEFECT LOCALIZATION

BACKGROUND OF THE INVENTION

1. Field of the Invention

This invention relates to a method of locating defects in underground conduits, and in particular to locating leaks in steam pipes buried in noisy environments, determining the rate and direction of flow within a conduit, and locating defects in electrical conduits.

2. Description of Related Art

A. Introduction

Conduits for transmission are often buried to protect them, and to save space. This is common in and around cities for the transmission of water and steam, around industrial plants for the transmission of chemicals or fuels, or even across the country for the transmission of natural gas and electric power. Leaks in any of these conduits can be costly due to the loss of the transmitted fluid and dangerous because of the accumulation of toxic or explosive fluids outside the conduit.

Responsible practice therefore requires the detection of a leak, its precise location, and its repair. The location of the leak is most important in crowded environments due to the disruption caused by excavation. One method to detect the leak is to use surface sensor techniques which are hindered by traffic, by turbulent flow within the conduit, by any discontinuities in the conduit such as joints and traps, or by noise generated by adjacent conduits. Another method is to drill "bare holes" down to the conduit. This can be dangerous to the integrity of the conduit and to repair personnel.

Common systems of leak detection include: acoustic emission, infrared spectroscopy, tracer gas, and electrical (Detection and Location of Leaks in District Heating Systems, D. S. Kupperman et al., Argonne National Laboratories, ANL 92/5, March 1992). Half of the users of acoustic technology feel that current acoustic methods are not as effective as they desire (ibid.).

B. Characteristics of Steam Conduits

Acoustic methods of detection are further complicated by the differing transmission properties of the conduit itself, typically a metal, and the medium being transmitted, either a gas or a fluid. Experience has shown that the acoustic energy released by a steam leak propagates down the metal conduit in three modes with velocities of about 2500, 4000, and 6000 feet per second for 16 inch or 24 inch diameter steam conduit. The frequencies propagating in the metal are strongest below 1000 Hz and are severely attenuated at higher frequencies. Steam conduits also contain thermal expansion joints, and the leak noise is not discernible across these joints.

The primary medium for acoustic leak location is therefore the steam, where propagation is unaffected by the expansion joints. The propagation is multimode, with the strongest amplitudes propagating with velocities about 500 and 1000 feet per second, and with least attenuation between 1000 and 8500 Hz. The leak noise attenuates at a rate between 0.07 and 0.15 dB per foot between these frequencies. The movement of steam also creates a flow noise caused by discontinuities such as joints and by turbulence at higher flow rates. Experiment has shown that the flow noise amplitude is greatest below 2500 Hz.

A steam conduit is clearly not an ideal transmission line for the propagation of information. Solving the wave equation, which is well known in the communication art, predicts what modes might be supported by the conduit, but factors such as the location of the leak and the structural support for the conduit determine which modes actually propagate, and this differs at every site. The propagation velocity is therefore different at each site depending upon which modes propagate.

C. Needs

Accordingly, there is a need to accurately locate leaks in conduits, particularly where the cost of excavation is high and where the danger to property, the environment, and humans is great. Non-intrusive methods to determine the propagation velocity of leak noise, the medium flow rate, and its direction would enhance locating the leak. Extending the range of detection, particularly in low signal to noise ratio locations, would also improve the process.

3. Summary of the Invention

The present invention relates to a method to more accurately locate a leak in a conduit, particularly in a noisy environment. The present invention also relates to a method of determining the flow rate and direction of a medium in a conduit.

In one embodiment of the invention, sensors are attached to the conduit at three locations where they are separated by a known distance from each other. Noise from the steam leak propagating in the conduit is detected by the sensors and an electrical signal is generated at each location. The signals are recorded and converted into digital form to preserve them. Each signal is filtered to pass a frequency band from 4000 to 8500 Hz to discriminate against turbulent flow noise in the steam, noise transmitted by the conduit, and single frequency tones. A cross-correlation function from leak noise data obtained from a first pair of the three sensors located along the conduit is calculated to obtain a raw plot of a first time differential. In general, "time differential" refers to the raw cross-correlation function (plot), which measures the time delay for each mode of propagation, therefore, having many peaks A cross-correlation function is also calculated from leak noise data obtained from a second pair of the three sensors located along the conduit to get a raw plot of a second time differential. These plots are smoothed to obtain a peak time differential in each plot. "Peak time differential" refers to the peak obtained after smoothing the raw cross-correlation function. This peak refers to the delay used in the localization equations. The velocity of propagation for leak noise in the conduit is then calculated using the first peak time differential and the known spacing between the first pair of sensors. An uncorrected location of the leak is determined using the velocity of propagation, the second peak time differential, and the known spacing between the second pair of sensors. This location may be adjusted by considering the rate and direction of flow of a medium within the conduit to determine the final leak location as disclosed herein.

In alternative measurement of the invention, an acoustic method determines the flow rate and direction of steam flowing in a conduit. Sensors are attached to the conduit at two locations which are separated by a known distance. A vibration is imposed upon the conduit on one side of the sensors, and it is detected by both sensors. The process is repeated where a second vibration is imposed on the other side of the sensors. The signals generated by the sensors are recorded, in either analog or digital form, filtered to pass a frequency band from 4000 to 8500 Hz to discriminate against turbulent flow noise in the steam, noise transmitted by the conduit, and single frequency tones, and then a cross-correlation function from data obtained from the sensors from the first imposed vibration is calculated to obtain a raw plot of a first time differential, and the same is done for the second vibration. Each raw plot of time differential is smoothed to obtain a peak time differential in each plot. The center velocity of propagation is determined using the first peak time differential and the known spacing between the sensors, and the process is repeated for propagation in the other direction. The flow rate and direction of the medium in the conduit are then calculated from the difference in velocities.

In a further embodiment of the invention, a defect in an electrical conduit is located by imposing an electrical pulse upon the conductor with sufficient potential to cause an electric discharge at the defect. The acoustic energy liberated by the electric discharge is determined with two sensors, each mounted to the conduit and separated from the other along a length of the conduit which does not include the defect. Recording of the acoustic data can be synchronized to the leading edge of the pulse. The envelope of a cross-correlation function for each sensor signal is calculated to determine its peak which provides the time differential between the leading edge of the electrical pulse received at the first sensor and that received at the other sensor. The velocity of acoustic energy propagation is calculated from the time differential provided by a cross-correlation function of data from the two sensors and the known spacing between them. Inspection of the sign of the time differential determines which sensor is nearest to the defect. The location of the defect is computed knowing the velocity of propagation of the acoustic energy, the nearest sensor location, and the time of propagation to that sensor. The defects in this case may include an electrical leakage path in a solid dielectric or a leak in a fluid dielectric.

In still another embodiment of the invention, a defect in an electrical conduit is located by imposing an electrical pulse upon the conductor with sufficient potential to cause an electric discharge at the defect. The acoustic energy liberated by the electric discharge is determined by three sensors, each spaced from the others by a known distance along the conduit. The span between one pair of these sensors includes the location of the defect. Computing cross-correlation functions between data from pairs of sensors, and smoothing the plots to get peak time differentials provides a velocity of propagation of acoustic energy and the location of the defect. The defects in this case may include an electrical leakage path in a solid dielectric or a leak in a fluid dielectric.

The previously described versions of the present invention have many advantages including: the ability to better locate a leak in a buried conduit, to protect the environment and to reduce the cost and disruption of excavation; the ability to locate leaks in a noisy environments which are typical in cities, and to reject uninteresting sources of noise which include turbulent flow within the conduit, discontinuities in the conduit such as joints and traps, or noise generated by adjacent conduits; the ability to detect a leak at greater distances from the sensors; the ability to determine the direction and flow rate of a medium within a conduit in a non-intrusive manner; and the ability to locate a defect in an electrical transmission line.

These and other features and advantages of the invention will be better understood with consideration of the following detailed description of the preferred embodiments taken in conjunction with the accompanying drawings.

5. Detailed Description of the Preferred Embodiments

Figure 1A:
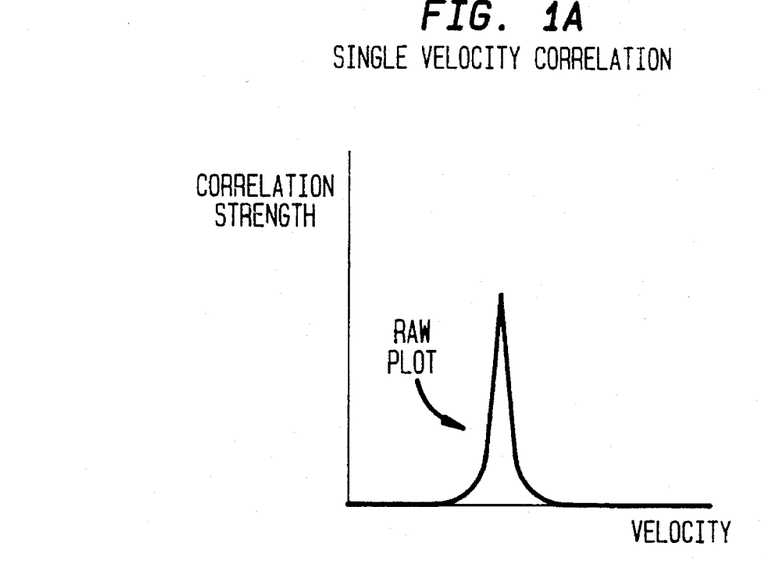
FIG. 1 shows strength versus velocity plots for single and multimode transmission of sound in a conduit filled with a medium, and in particular the transmission of steam leak noise through the metal of the conduit and through the steam.
Figure 1B:
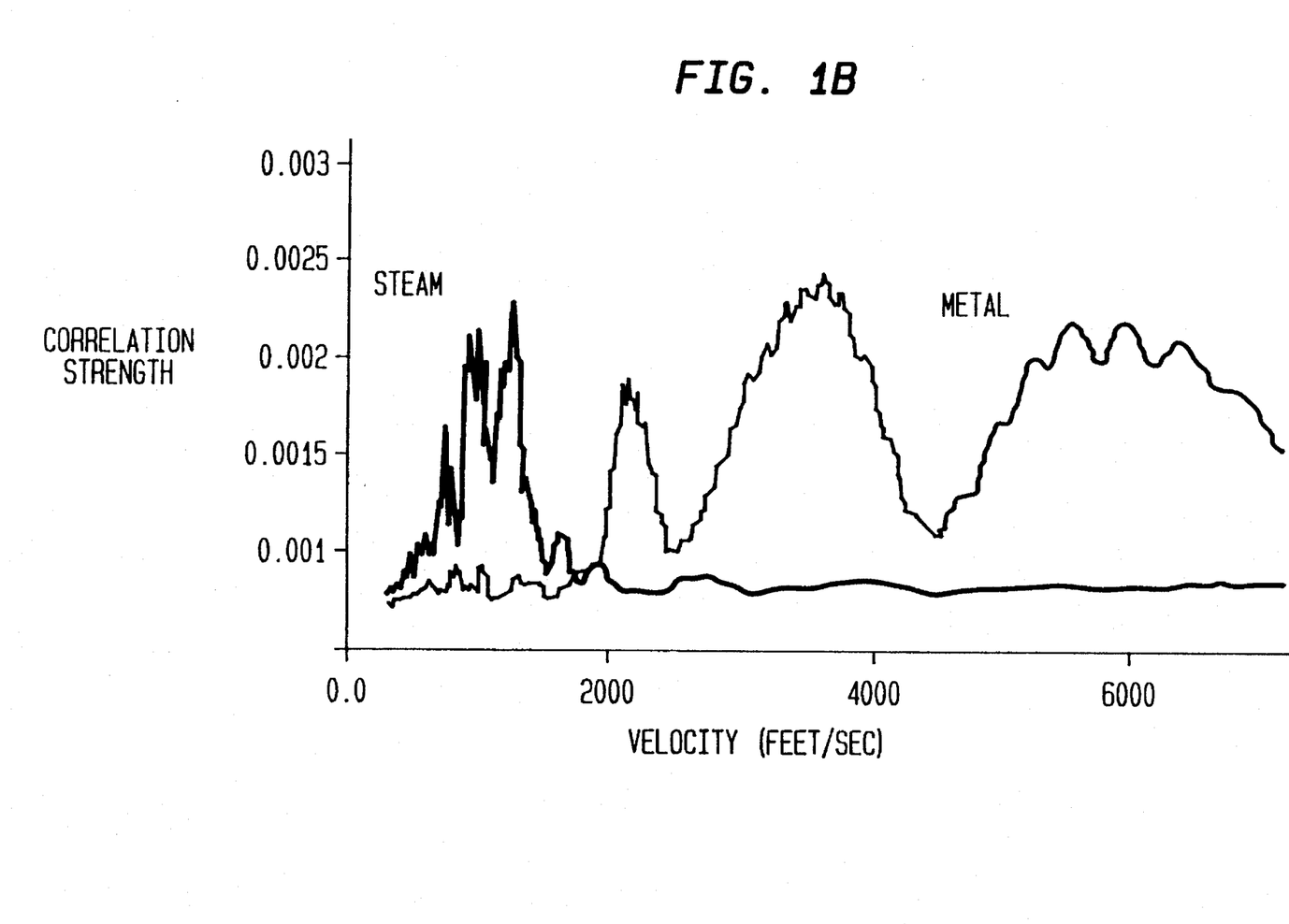
Figure 1C:
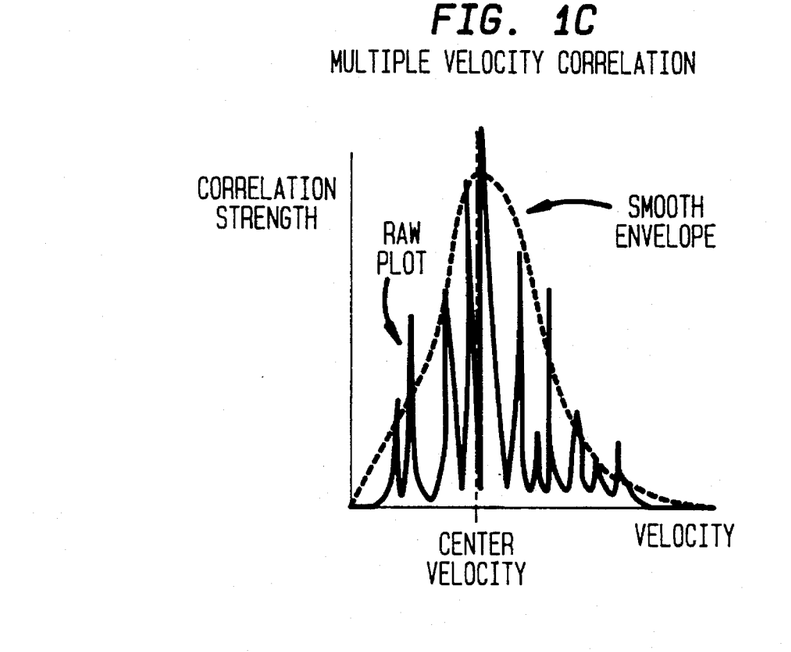

The undesirable properties of steam conduit as a transmission medium which were previously described may be summarized in FIG. 1. FIG. 1A shows an idealized plot of correlation strength versus velocity where there is only one mode propagating. FIG. 1B shows the correlation strength versus propagation velocity for sound traveling in the metal and in the steam. Three characteristic peaks for metal propagation are above 2000 feet per second while a series of peaks for steam propagation is below 2000 feet per second. FIG. 1C shows a raw plot of correlation strength versus frequency for the case of steam leak noise propagating in a multimode case. The raw data are smoothed by computing the envelope of the raw cross-correlation curve to define a center velocity at the peak of the envelope. Smoothing is a simple averaging whereby a point on the smooth curve is created by replacing that same point on the raw curve with an average of all points in the vicinity. An exemplary smoothing equation is as follows:

$$S(x) = 1/2N \sum_{i=1}^{N} [R(x+i) + R(x-i)]$$

wherein a point S(x) on a smoothed curve is created by replacing that same point on a raw curve with the average value of all the raw points "in the vicinity of" R(x), wherein N is the site of the averaging window, i.e., the vicinity.

The cross-correlation method is well known in signal processing, for example, see "Digital Signal Processing" Oppenheim & Schafer, Prentice Hall, 1975, pages 556–562. The method is insensitive to noise because each sensor needs to detect it. The resulting improvement in signal to noise ratio allows the sensors to be placed three times farther apart than in previous methods.

The correlation strength is derived from two sensor measurements along the conduit where analog data is converted to digital form and cross-correlated to provide the time delay as noise propagates between pairs of sensors. Knowing the distance between sensors yields the velocity. This well known method of signal processing is used for continuous noise where there is no time equals zero event.

In principle, the process can also be applied to an analog signal, but it is easier in digital form. The signals are also usually filtered to select a band of frequencies, usually 4000 to 8500 Hz in the case of steam, where the leak noise is strongest as compared to flow noise or noise transmitted by the metal. Single frequency tones may be removed by Smoothed Coherence Transform, SCOT, filtering (Carter et al. Proc. IEEE (Lett), 61, 1497, 1973).

Figure 2A:
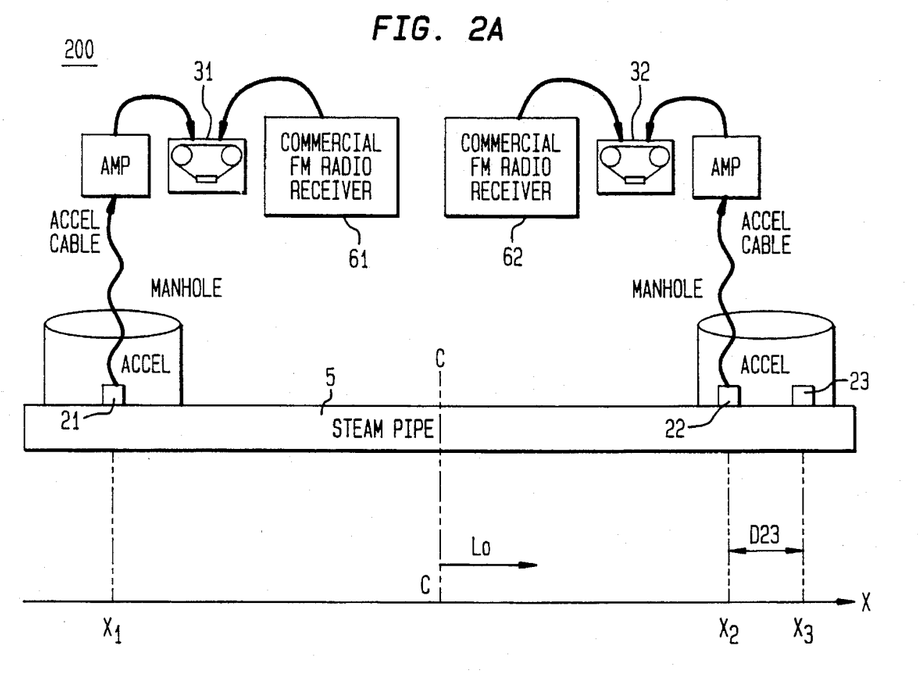
FIG. 2 shows a typical conduit supporting sensors which detect acoustic energy, and diagrams representing the inputs to a cross-correlation calculation and typical outputs therefrom.
Figure 2B:
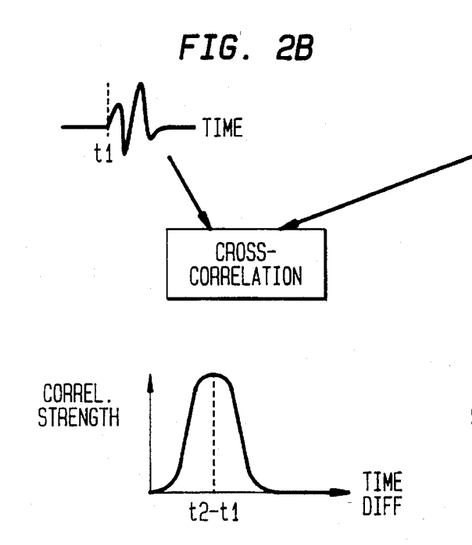
Figure 2C:
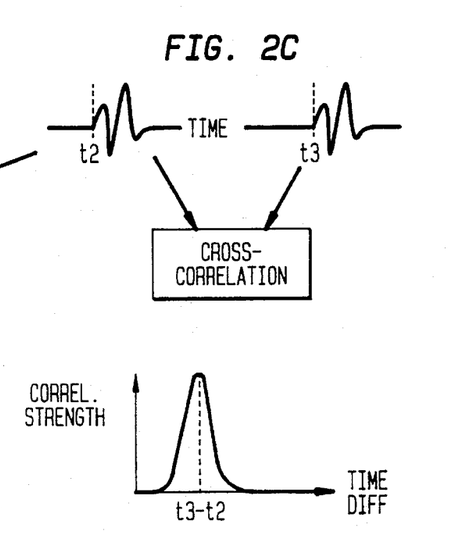

Referring now to FIG. 2, there is shown apparatus 200 in accordance with one embodiment of the invention which is a method to locate a continuous leak in a conduit 5, which may be a buried steam conduit. Sensors 21, 22, and 23 are mounted to the conduit, by fasteners, by an adhesive, or preferably by welding. Sensors 22 and 23 are in the same manhole and constitute a first pair of sensors, separated from each other by approximately one to ten feet. Sensor 21 is in another manhole which may be 500 feet away. Sensors 21 and 22 constitute a second pair of sensors. In one embodiment, the sensors were Model 4378 Accelerometers from Bruel & Kjaer Instruments, Inc., Marlborough, Mass.

Steam leak vibration data comprised of the output from one or more vibration transducers, which convert vibrations normal to the pipe surface into electrical signals whose amplitude is proportional to the amplitude of the acoustic vibration is acquired from all three sensors, at a minimum, one pair at a time, and recorded, typically upon digital audio tape. First receiver 61 and second receiver 62 may provide a synchronization pulse to recorders 31 and 32, respectively, where they are widely separated to provide a reference for analysis of the data. Alternatively, a cable could be run along the right, of-way and all the sensor data could be recorded on different channels of the same recorder.

The signals are filtered to pass a frequency band from 4000 to 8500 Hz to discriminate the steam leak noise propagating in the steam from turbulent flow and from noise transmitted by the conduit. Filtering may also be performed to eliminate single frequency tones.

A cross-correlation function is computed between sensors 22 and 23. This raw data plot, containing a multiplicity of peaks, is smoothed in an envelope processing step to develop a curve with a single peak, as shown in FIG. 2B, which corresponds to the time differential the leak noise needs to traverse the known distance between sensors 22 and 23. A center velocity for leak noise propagation in this particular conduit is calculated from this information.

The same steps are performed for data gathered by sensors 21 and 22 to obtain the average time delay for noise from the leak to reach sensor 22 as compared to sensor 21. An uncorrected leak location, Lo, measured from the midpoint, C—C, between sensors 21 and 22 is given by, $$Lo = 0.5 \, v\{t1-t2\}$$

where v was calculated from the cross-correlation and smoothing operations upon the signals from sensors 22 and 23 to give $$v = D23/\{t3-t2\}.$$

The uncorrected leak location, Lo, does not account for the direction and velocity of the steam. This information may be obtained by the method described in FIG. 3.

Figure 3:
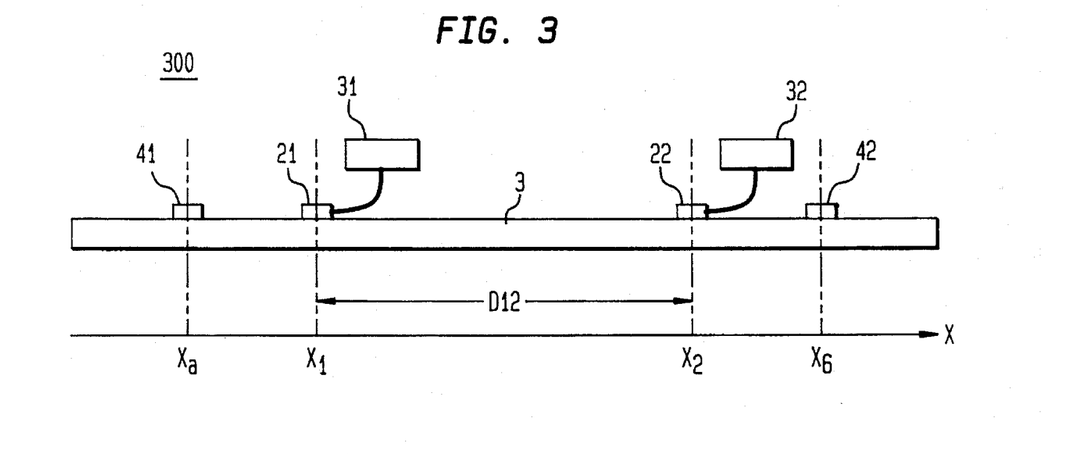
FIG. 3 shows a typical conduit supporting sensors and transducers which are used to determine the rate and direction of flow of a medium in a conduit.
Figure 3A:
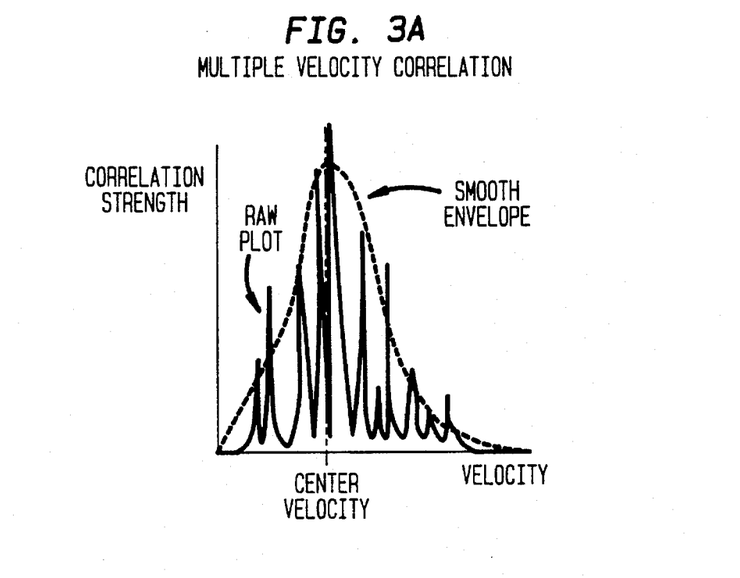
FIG. 3A shows a typical output from smoothing raw data from a cross-correlation calculation.

Referring now to FIG. 3, there is shown apparatus 300 which is in accordance with another embodiment of the invention. Where the elements of apparatus 300 are the same as apparatus 200 the same reference numbers are shown.

In many utilities there are no pressure gauges or flow meters along conduits of interest. To determine the flow in a conduit, in a non-intrusive way where there is no leak, a method employing two sensors is used.

FIG. 3 shows a conduit 3, along an axis X, transporting a fluid of unknown speed and direction. Sensors 21 and 22 are attached to the conduit at locations x1 and x2, respectively. separated by a known distance D12. A transducer 41, located at any position, xa, less than or equal to x1 impresses a vibration upon the conduit. The transmitted components of the vibration are sensed and recorded at positions x1 and x2 in a manner described above. The process is repeated whereby a second transducer 42 located at any position, xb, equal to or greater than x2 impresses a vibration whose components are sensed and recorded at x1 and x2. The functions of the transducers at xa and xb may be performed, for example by a simple hammer blow.

The center velocities of propagation in each direction are computed by cross-correlation and envelope smoothing, as before. In one measurement, the sound will propagate in the same direction as the flow; while in the other case it will propagate in a direction opposing the flow. The flow rate is half of the difference between the two velocities and the direction of flow corresponds to the faster velocity.

Figure 4A:
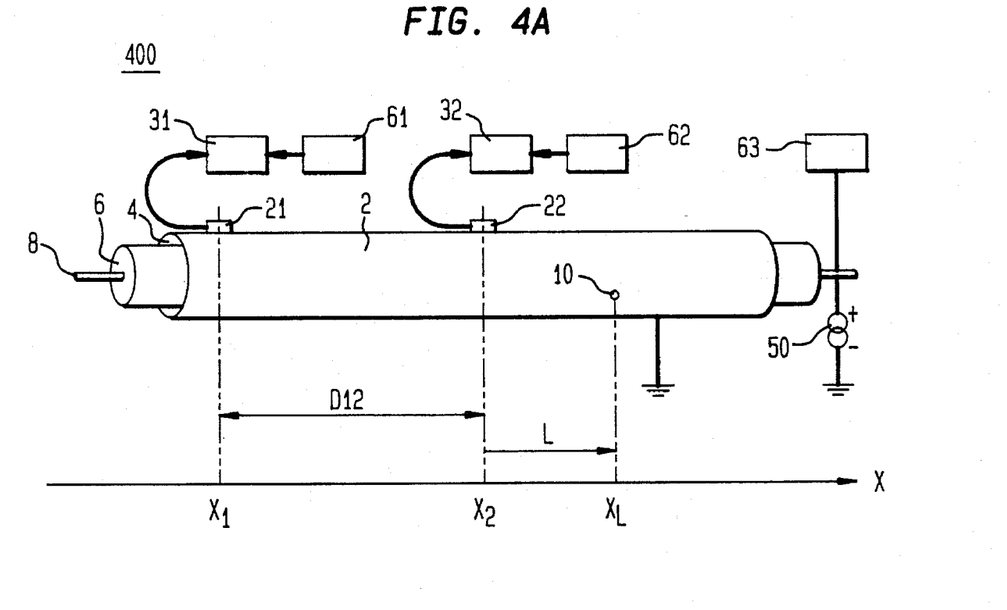
FIG. 4 shows a power transmission line with elements used to locate a fault therein.

Referring now to FIG. 4A, there is shown apparatus 400 in accordance with one embodiment of the invention. Power conduit 2 has a jacket 4 which surrounds dielectric 6 which surrounds conductor 8. The dielectric may be a solid or a fluid. Power conduit 2 contains a defect 10 which may be a leak through jacket 4 for the case of a fluid dielectric, or an electrical leakage path through the dielectric if it is a solid. The conduit is considered to lie along an axis X. A first sensor 21 is mounted to the conduit at location x1, and a second sensor is mounted to the conduit at location x2. The sensors are separated by a distance D12. Defect 10 is located outside the span of the sensors at a distance L from the nearest one. A first recorder 31 is connected to first sensor 21, and a second recorder 32 is connected to sensor 22. A pulse generator 50 is connected to conductor 8. One end of the pulse generator and the jacket are electrically grounded. Commercial FM receivers 61 and 62 provide synchronization signals to the recorders coincident with a pulse from generator 50 via transmitter 63.

In the process of locating the defect, arcing is induced at the defect by a short, high potential pulse propagating along the conduit from the generator. This so-called "hi-pot" method is also used to clear shorted capacitors. The pulse travels at much higher velocity than sound waves generated at the defect, so it may be regarded as instantaneous all along the line and may be used to synchronize the data gathering process.

The transmitted acoustic energy liberated by the electric discharge is detected with the two sensors and recorded. An envelope of a cross-correlation function is computed to obtain t1–t2, the time the acoustic energy takes to propagate the distance D12. The velocity of propagation is determined from the time and distance. The sign of the quantity (t1–t2) indicates on which side of the sensors the defect is located. The location of the defect is determined from the nearest sensor knowing t1 or t2 from the electrical impulse. Therefore

| | | |
|---|---|---|
| $L = -vt1$ | for $L < x1$ | measured from x1; or |
| $L = vt2$ | for $L > x2$ | measured from x2. |

Figure 4B:
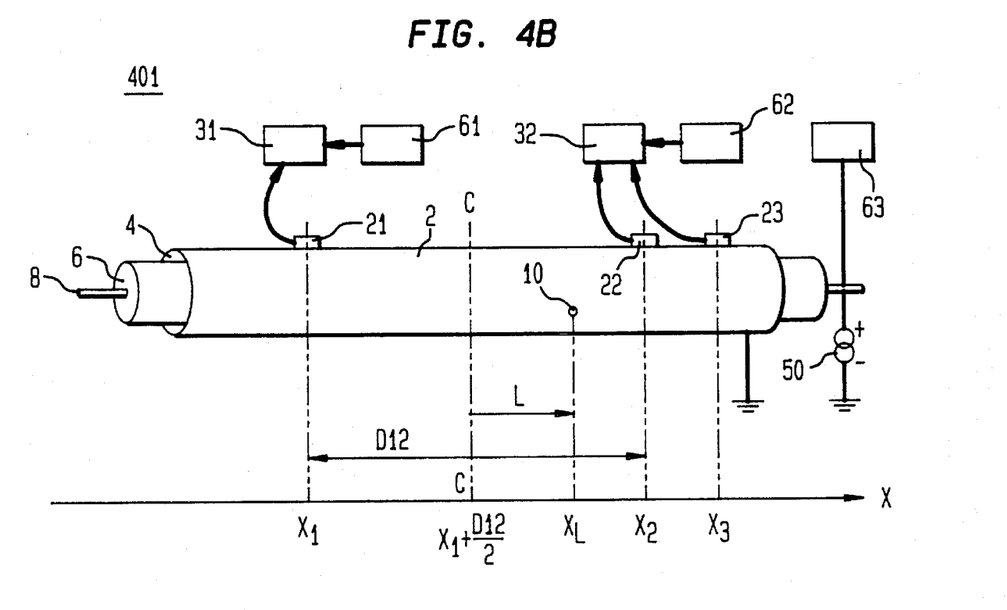

Referring now to FIG. 4B, there is shown apparatus 401 which is similar to apparatus 400 except that the defect 10 is located between sensors 21 and 22, and sensor 23 has been mounted at x3. In this case, the procedure to locate the defect is the same as that given in the discussion for apparatus 200 in FIG. 2.

Some advantages over the use of surface detection methods are: the ability to better locate a leak in a buried conduit to protect the environment and to reduce the cost and disruption of excavation; the ability to locate leaks in a noisy environments which are typical in cities, and to reject uninteresting sources of noise which include turbulent flow within the conduit, discontinuities in the conduit such as joints and traps, or noise generated by adjacent conduits; increasing the distance over which a leak may be found; the ability to determine the direction and flow rate of a medium within a conduit in a non-intrusive manner; and the ability to locate a defect in an electrical transmission line. For the electrical line, the number of "hi-pot" attempts needed to locate the defect is greatly reduced, thereby minimizing the potential for destroying good dielectric by over-stressing it.

Changes and modifications in the specifically described embodiments can be carried out without departing from the scope of the invention. In particular, the apparatus and method described for determining the direction and flow rate of a medium may be incorporated with the embodiment for locating a leak. The spectrum of frequencies which are used in the cross-correlation operation may be selected for each combination of conduit and medium to maximize leak noise data and to discriminate against unwanted frequencies. Sensors may be connected directly into a computer wherein processes such as, but not limited to: filtering, digital conversion, signal processing, smoothing, synchronization, and the calculations of flow rate, direction, and defect location are performed.

I claim:

1. A method of locating a leak in a conduit, comprising the steps of:

computing a cross-correlation function from leak noise data from said conduit obtained from a first pair of sensors including a first and second sensor coupled to said conduit at a spaced interval for obtaining a raw plot of a first time differential for said leak noise to traverse said spaced interval;

computing a cross-correlation function from leak noise data obtained from a second pair of sensors including said second sensor and a third sensor coupled to said conduit at a second spaced interval for obtaining a raw plot of a second time differential for said leak noise to traverse said second spaced interval;

smoothing each raw plot of time differential by computing an envelope having a single peak for obtaining a peak time differential in each plot;

determining the velocity of propagation for leak noise in the conduit using the first peak time differential and the known spacing between the first pair of sensors; and determining the location of the leak using the velocity of propagation, the second peak time differential, and the known spacing between the second pair of sensors.

2. The method of claim 1 further comprising synchronizing the recording of the leak noise data from each sensor along the conduit by providing a synchronization pulse.

3. The method of claim 2 further comprising synchronizing the recording with a radio signal.

4. The method of claim 1 further including analog to digital conversion means and comprising converting the leak noise data from three spaced apart locations along the conduit from analog to digital form.

5. The method of claim 1 further comprising filtering leak noise data to pass a particular frequency band.

6. The method of claim 1 further comprising filtering the leak noise data to exclude single frequency tones.

7. The method of claim 1 further comprising correcting the location calculation by including the rate and direction of flow of a medium within the conduit for determining the final leak location.

8. A method of locating a leak in a conduit, comprising the steps of:

providing sensors for sensing leak noise propagating in the conduit at three spaced apart locations along its length for generating an electrical signal at each location;

recording each signal in digital form;

computing a cross-correlation function from leak noise data obtained from a first pair of sensors including a first and second sensor coupled to said conduit for obtaining a raw plot of a first time differential for said leak noise to traverse an interval between said first and second sensor;

computing a cross-correlation function from leak noise data obtained from a second pair of sensors including said second sensor and a third sensor coupled to said conduit for obtaining a raw plot of a second time differential for said leak noise to traverse an interval between said second sensor and third sensor;

smoothing each raw plot of time differential for obtaining a peak time differential in each plot;

determining the velocity of propagation for leak noise in the conduit using the first peak time differential and the known spacing between the first pair of sensors;

determining an uncorrected location of the leak using the velocity of propagation, the second peak time differential, and the known spacing between the second pair of sensors; and adjusting the uncorrected location calculation by including the rate and direction of flow of a medium within the conduit for determining the final leak location.

9. The method of claim 8 further comprising synchronizing the recording of the leak noise data from each sensor along the conduit by providing a synchronization pulse from a receiver.

10. The method of claim 9 further comprising synchronizing the recording with a radio signal.

11. The method of claim 9 further including analog to digital conversion means and comprising converting the leak noise data from three spaced apart locations along the conduit from analog to digital form.

12. The method of claim 8 further comprising filtering leak noise data to pass a particular frequency band.

13. The method of claim 8 further comprising filtering the leak noise data to exclude single frequency tones.

14. The method of claim 8 wherein piezoelectric sensors are attached to the conduit at three spaced apart locations.

15. An acoustic method of locating a leak in a buried steam conduit having a fluid with multiple velocities of acoustic energy contained therein, comprising the steps of:

attaching sensors to the conduit at a first, second, and third location, respectively, where each location is separated by a known distance from the others;

sensing steam leak noise propagating in the conduit from waves propagating normal to an outside surface of said conduit with said sensors to thereby generate an electrical signal at each location proportional to said steam leak noise;

providing synchronization to a recording operation for signal processing;

recording each signal in digital form for preserving it;

filtering each signal to pass a frequency band from 4000 to 8500 Hz for discriminating against turbulent flow noise in the steam, noise transmitted by the conduit;

filtering each signal to exclude single frequency tones;

computing a cross-correlation function from leak noise data obtained from a first pair of sensors located along the conduit for obtaining a raw plot of a first time differential;

computing a cross-correlation function from leak noise data obtained from a second pair of sensors located along the conduit for obtaining a raw plot of a second time differential;

smoothing each raw plot of time differential for obtaining a peak time differential in each plot;

determining the velocity of propagation for leak noise in the conduit using the first peak time differential and the known spacing between the first pair of sensors;

determining an uncorrected location of the leak using the velocity of propagation, the second peak time differential, and the known spacing between the second pair of sensors; and adjusting the uncorrected location calculation by including the rate and direction of flow of a medium within the conduit for determining the final leak location.

16. A method of determining the flow rate and direction of a medium within a conduit comprising the steps of:

coupling a pair of sensors to said conduit at a first and second location thereof;

imposing a first vibration upon the conduit at a position proximate a first sensor in said pair of sensors said position being outside of a region located between said pair of sensors which are separated by a distance and mounted to the conduit;

detecting a first transmitted vibration propagating along the conduit in response to said imposed vibration at both sensors;

repeating the steps above wherein a second vibration is imposed at a second position proximate a second sensor in said pair of sensors, said position being outside of said region located between said pair of sensors;

determining the center velocity of each transmitted vibration by computing an envelope correlation function; and calculating the direction of fluid flow and its velocity.

17. The method of claim 16 wherein the vibrations are detected by piezoelectric crystals thereby being converted to electrical signals.

18. The method of claim 16 wherein the vibrations are imposed by a transducer.

19. The method of claim 16 wherein vibration data is converted from analog to digital form.

20. The method of claim 16 further comprising filtering vibration data to pass a particular frequency band.

21. The method of claim 16 further comprising filtering the vibration data to exclude single frequency tones.

22. An acoustic method of determining the flow rate and direction of steam flowing in a conduit, comprising the steps of:

attaching a sensor to the conduit at a first and second location along the conduit, where each location is separated by a known distance from the other;

imposing a first vibration upon the conduit at a position proximate a first sensor in said pair of sensors, said position being outside of a region located between said sensors;

detecting a first transmitted vibration propagating along the conduit in response to said imposed vibration at both sensors;

imposing a second vibration upon the conduit at a second position proximate a second sensor in said pair of sensors, said position being outside of said region located between said pair of sensors;

detecting a second transmitted vibration propagating along the conduit in response to said imposed vibration at both sensors;

converting signals produced from said sensors from analog to digital form;

recording each signal in digital form for preserving it;

filtering each signal to pass a frequency band from 4000 to 8500 Hz for discriminating against turbulent flow noise in the steam, noise transmitted by the conduit;

filtering each signal to exclude single frequency tones;

computing a cross-correlation function from data obtained from the sensors from the first imposed vibration propagating along the conduit for obtaining a raw plot of a first time differential;

computing a cross-correlation function from data obtained from the sensors from the second imposed vibration propagating located along the conduit for obtaining a raw plot of a second time differential;

smoothing each raw plot of time differential for obtaining a peak time differential in each plot;

determining the first center velocity of propagation of imposed vibration in the conduit using the first peak time differential and the known spacing between the sensors;

determining the second center velocity of propagation of imposed vibration in the conduit using the second peak time differential and the known spacing between the sensors; and calculating the flow rate and direction of the medium in the conduit, wherein said flow rate is calculated as half of the difference between said first and second center velocity and said direction corresponds to the greater one of said first and second velocity.

23. The method claim 5, wherein said frequency band includes frequencies in a range between 4000 and 8500 Hz.

24. The method of claim 6, wherein said single frequency tones are removed by means of a Smoothed Coherence Transform (SCOT).

25. The method of claim 1, wherein said spaced interval between said first and second sensor is between 1 and 10 feet.

26. The method of claim 7, wherein said rate and direction of flow are calculated utilizing the following steps:

imposing a first vibration upon the conduit at a position proximate a first sensor in a pair of sensors, said position being outside of a region located between said pair of sensors which are separated by a distance and mounted to the conduit;

detecting a first transmitted vibration propagating along the conduit in response to said imposed vibration at both sensors;

repeating the steps above wherein a second vibration is imposed at a second position proximate a second sensor in said pair of sensors, said position being outside of said region located between said pair of sensors;

determining the center velocity of each transmitted vibration by computing an envelope correlation function; and calculating the direction of fluid flow and its velocity.

27. The method of claim 16, wherein said flow rate is calculated as half of the difference between the center velocities and said direction corresponds to the greater one of said velocities.

* * * * *